(12) United States Patent
Endo (10) Patent No.: US 7,350,778 B2
(45) Date of Patent: Apr. 1, 2008

(54) TORQUE ROD

(75) Inventor: Masami Endo, Niwa-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 170 days.

(21) Appl. No.: 11/079,168

(22) Filed: Mar. 15, 2005

(65) Prior Publication Data

US 2005/0212188 A1    Sep. 29, 2005

(30) Foreign Application Priority Data

Mar. 19, 2004    (JP) ............... 2004-081183

(51) Int. Cl.
F16F 7/00    (2006.01)

(52) U.S. Cl. ............ 267/141.2; 267/141; 267/292; 267/140.5; 248/610; 248/60

(58) Field of Classification Search ........ 267/141, 267/141.2, 292, 140.5; 384/430, 268; 403/187; 248/60, 610; 180/291, 300
See application file for complete search history.

(56) References Cited

U.S. PATENT DOCUMENTS

| 5,364,061 | A | * | 11/1994 | Ciolczyk et al. | ............. 248/610 |
| 5,398,907 | A | * | 3/1995 | Kelchner | ................... 248/634 |
| 6,113,058 | A | | 9/2000 | Iwasaki | |
| 2005/0206057 | A1 | * | 9/2005 | Endo | ........................ 267/292 |
| 2005/0254888 | A1 | * | 11/2005 | Oji | ............................. 403/187 |

FOREIGN PATENT DOCUMENTS

| CN | 1380205 A | | 11/2002 | | |
| EP | 1677015 A1 | * | 7/2006 | | |
| JP | U-50-003217 | | 1/1975 | | |
| JP | 6334111 A | * | 2/1988 | ............... 264/279 |
| JP | 1126413 A | * | 5/1989 | ............... 384/430 |
| JP | B2-04-074569 | | 11/1992 | | |
| JP | B2-05-014806 | | 2/1993 | | |
| JP | A-06-109075 | | 4/1994 | | |
| JP | A-07-004459 | | 1/1995 | | |
| JP | A-07-035127 | | 2/1995 | | |
| JP | A-07-197927 | | 8/1995 | | |
| JP | A-08-233030 | | 9/1996 | | |
| JP | A-10-299805 | | 11/1998 | | |
| JP | A-2002-301743 | | 10/2002 | | |
| JP | A-2003-206991 | | 7/2003 | | |
| JP | 2004-255971 A | * | 9/2004 | | |
| JP | A-2004-255967 | | 9/2004 | | |
| WO | WO 2005/023574 A1 | | 3/2005 | | |

* cited by examiner

Primary Examiner—Robert A. Siconolfi
Assistant Examiner—Mariano Sy
(74) Attorney, Agent, or Firm—Oliff & Berridge, PLC

(57) ABSTRACT

A torque rod comprising: a first and second bushing disposed at both ends of the resin torque rod, each bushing having a resin outer casing and a rigid inner casing and a rubber elastic body interposed between the outer and inner casings, and a connecting component for connecting the first and second bushings, The connecting component has a predetermined breaking location adapted to be broken upon input of a substantial load during collisions, the predetermined breaking location includes a thin-walled portion provided at a location where the thin-walled portion undergoes compression break upon input of the substantial load, and a thick-walled portion provided at a location apart from a central axis of the connecting component in a perpendicular direction to the central axis of the connecting component.

8 Claims, 6 Drawing Sheets

PRIOR ART

FIG.7B

PRIOR ART

TORQUE ROD

INCORPORATED BY REFERENCE

The disclosure of Japanese Patent Application No. 2004-081183 filed on Mar. 19, 2004 including the specification, drawings and abstract is incorporated herein by reference in its entirety.

BACKGROUND OF THE INVENTION

1. Field of the Invention

The present invention relates to a torque rod that is interposed between the engine and body of a vehicle to control displacement in the engine rolling direction and the longitudinal direction, as well as to damp vibration between the engine and body. More specifically, the invention relates to a resin torque rod in which outer casings of the first and second bushings as well as a connecting component that connects at both ends with those bushings are made of resin.

2. Description of the Related Art

Conventionally, torque rods are mounted between the engine and body of a vehicle. These torque rods have first and second bushings at both ends, each of which has an outer and inner casing, with a rubber elastic body interposed therebetween, and a connecting component for connecting the first and second bushings, so that the torque rods can take up the torque from the engine to control displacement in the engine rolling direction and the longitudinal direction. Such torque rods also damp vibration between the engine and body.

Conventionally used torque rods include the parallel type of torque rod in which the first and second bushings are disposed in the same direction, and the perpendicular type of torque rod in which the first and second bushings are disposed facing each other at right angles.

Torque rods of the former parallel type have been disclosed, for example, in JP-U-50-3217, JP-B-4-74569, JP-B-5-14806, JP-A-6-109075 and JP-A-7-197927, and the latter perpendicular type has been disclosed in JP-A-8-233030 and JP-A-2003-206991.

To ensure the safety of the passengers in vehicles, this type of torque rod should be allowed to break at the locations between the first and second bushings fixed to the engine and body sides when substantial load is applied during vehicle collisions. A torque rod capable of realizing this has therefore been desired in the past.

SUMMARY OF THE INVENTION

It is therefore one object of this invention to provide a torque rod capable of realizing the mutually contradictory properties of sufficient rigidity and durability for normal driving and reliable breakability when substantial load is applied during vehicle collisions.

Figure 7A:
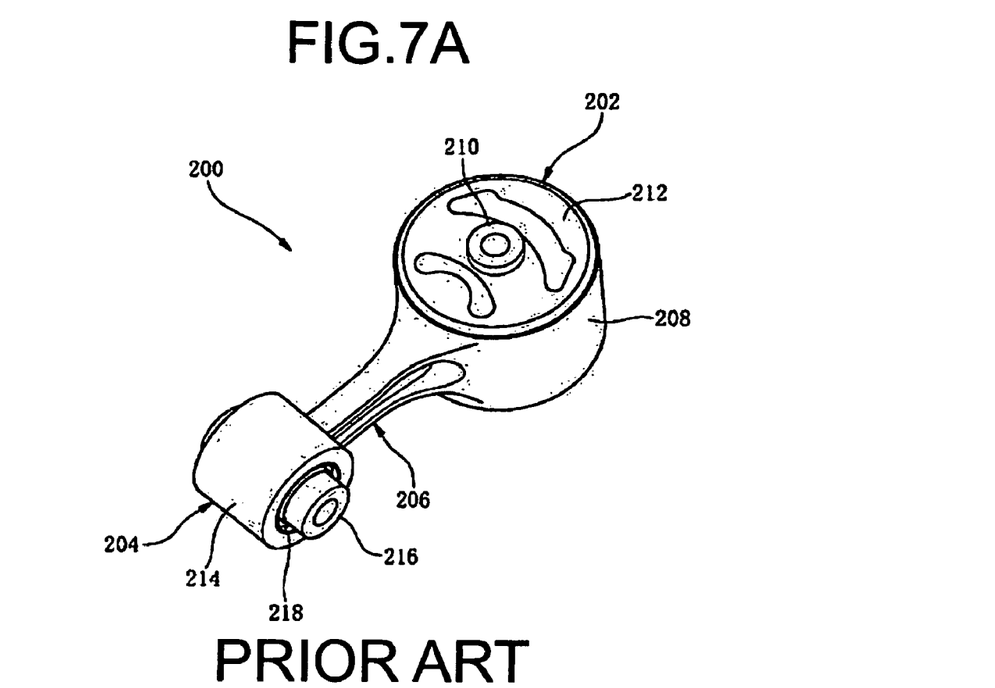
FIGS. 7A and 7B are perspective view of a torque rod of another type developed by the present inventor.
Figure 7B:
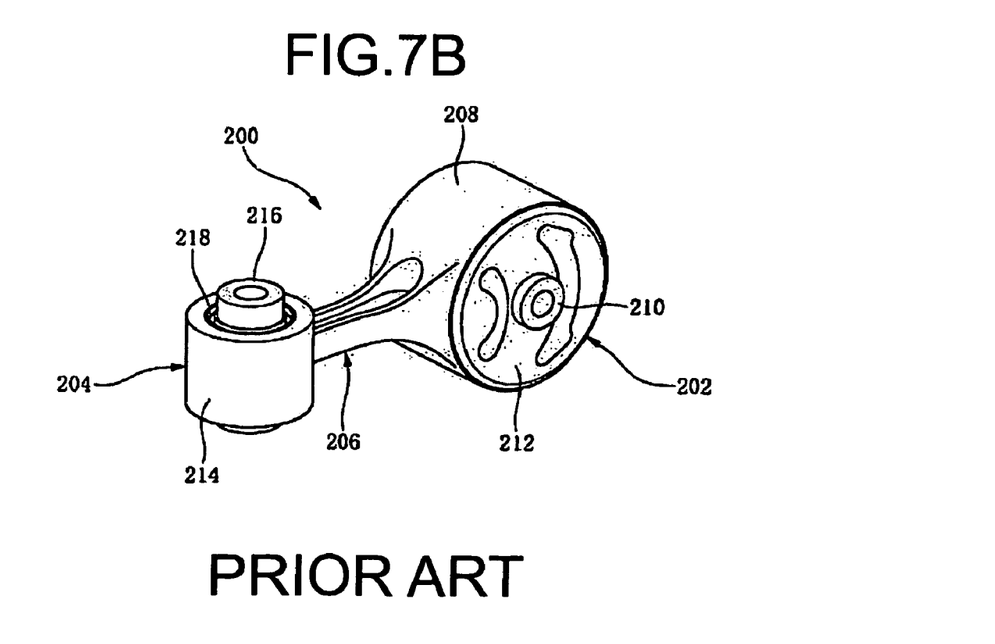

FIG. 7 illustrates an example of a torque rod proposed by the inventor to meet the conventional needs. In the FIG., 200 is a torque rod (e.g., a resin torque rod). 202 is a first bushing comprising a large bushing, and 204 is a second bushing comprising a small bushing, which are disposed facing each other at right angles. Specifically, the first bushing 202 and second bushing 204 are disposed with their axes at right angles to each other. The first bushing 202 and second bushing 204 are disposed apart from each other.

As illustrated, the fist bushing 202 comprises a resin outer casing 208, a metal inner casing 210, and a rubber elastic body 212 interposed between to join them. In this case, the rubber elastic body 212 is integrally bonded by vulcanization to the inner casing 210, and is also fixed to the outer casing 208 at the same time that the resin outer casing 208 is formed.

The second bushing 204 similarly comprises a resin outer casing 214, a metal inner casing 216, and a rubber elastic body 218. In the second bus 204, the rubber elastic body 218 is integrally bonded by vulcanization to the inner casing 216, and is also fixed to the outer casing 214 at the same time that the resin outer casing 214 is formed.

In the torque rod 200, the outer casing 208 of the first bushing 202, the outer casing 214 of the second bushing 204, and the connecting component 206 are In the form of a unitary resin molding.

In the torque rod 200 illustrated in FIG. 7, the connecting component 206 is formed thin, with the minimum cross section area needed to ensure the necessary rigidity and durability during normal driving (including acceleration and deceleration), so that the thin connecting component will break first at the point of substantial impact load during vehicular collisions.

However, when the connecting component 206 is formed thin, with the minimum necessary cross section area, the resulting rigidity and durability are not sufficient for normal driving. When attempts are made to ensure satisfactory rigidity and durability during normal driving, on the other hand, the cross sectional area of the connecting component 206 inevitably increases and becomes too large, making it more difficult to ensure that the connecting component 206 will break at the point of substantial impact load during collisions of the vehicles. Conversely, when attempts are made to ensure that the connecting component 206 will break at the point of substantial impact load during vehicular collisions, the rigidity and durability of the connecting component 206 are inadequate for normal driving, as noted above. Thus, this type of torque rod is insufficient to meet the conventional needs. In view of the above, the present inventor has been developed a torque rod according to the present invention that is capable of attaining the object of the present invention.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a torque rod comprising: a first and second bushing disposed at both ends of the resin torque rod, each bushing having a resin outer casing and a rigid inner casing and a rubber elastic body interposed between the outer and inner casings, and a connecting component for connecting the first and second bushings, wherein the connecting component has a predetermined breaking location adapted to be broken upon input of a substantial load during collisions, the predetermined breaking location includes a thin-walled portion provided at a location where the thin-wailed portion undergoes compression break upon input of the substantial load, and a thick-walled portion provided at a location apart from a central axis of the connecting component in a perpendicular direction to the central axis of the connecting component, A second mode of the present invention provides a torque rod according to the aforementioned first mode, wherein the thin-walled portion comprises a first bridge that is provided at a location apart to one side in the perpendicular direction from the central axis of the connecting component and being thin-walled in the perpendicular direction, and the thick-walled portion comprises a second bridge that is provided at a location apart to an other side in the perpendicular direction and that has a relatively thicker wall in the perpendicular direction than the first bridge; and a hollow space between the first and second bridges.

A third mode of the present invention provides a torque rod according to the aforementioned first or second mode, wherein the connecting component is made of resin.

A fourth mode of the present invention provides a torque rod according to any one of the aforementioned first through third modes, wherein the first and second bushings arc disposed facing each other at right angles, and the first and second bridges arc located at one and the other end, respectively, in the axial direction of the second bushing.

A fifth mode of the present invention provides a torque rod according to the aforementioned fourth mode, wherein the first bushing has a greater diameter tan the second bushing, and the second bushing is smaller.

A sixth mode of the present invention provides a torque rod according to the aforementioned fifth mode, wherein the predetermined breaking location is formed at a portion adjacent to the second bushing.

A seventh mode of the present invention provides a torque rod according to any one of the aforementioned fourth through sixth mode, wherein the connecting component is provided with a rib that extends in a direction from the first bushing toward the first bridge, preferentially transmitting the input substantial load from the first bushing, which is where the load is input, to the first bridge rather than to the second bridge.

A eighth mode of the present invention provides a torque rod according to the aforementioned seventh mode, the connecting component comprises a pair of mutually facing side panels that extend in the direction linking the first and second bushings, and a connecting portion connecting the side panels, the pair of side panels and connecting portion having a U- or H-shaped lateral cross section open in a same direction as an axial direction of the first bushing and the rib being located in a space on an inside of the pair of side panels.

As noted above, the invention comprises: the predetermined breaking location includes the thin-walled portion formed at a location where it undergoes compression break upon input of the substantial load during collisions of the vehicle, the thin-walled portion is readily to break at first. Since the thick walled portion of the predetermined breaking location is provided at the location apart from the central axis of the connecting component in the perpendicular direction to the central axis of the connecting component, the thick walled portion then undergoes shear deformation, resulting in breaking of the thick walled portion mainly by banding. The thin-walled portion may be provided at any location provided that the thin-walled portion undergoes compression break. Further, the present invention includes the torque rod wherein the predetermined breaking location includes a plurality of thick walled portions, provided that each thick walled portion is located at either side apart from the central axis of the connecting component in the perpendicular direction.

Preferably, the thin-walled portion comprises a first bridge that is provided at a location apart to one side in the perpendicular direction from the central axis of the connecting component and being thin-walled in the perpendicular direction, and the thick-walled portion comprises a second bridge that is provided at a location apart to an other side in the perpendicular direction and that has a relatively thicker wall in the perpendicular direction than the first bridge; and a hollow space between the first and second bridges. This facilitates breaking of the second bridge by bending after the breakage of the first bridge by compression. Namely, in the torque rod of the present invention, the thin-walled first bridge will buckle and break first when major impact load is applied during vehicular collisions. When the thin-walled first bridge thus breaks, substantial bending moment acts on the reran second bridge, so that the second bridge then readily breaks, allowing the connecting component in its entirety to break at the predetermined breaking location.

When substantial load is applied during collisions, the torque rod of the present invention will not break all at once at the predetermined breaking location, but will break sequentially and in steps, so that the connecting component will break in its entirety.

In the torque rod of the present invention, the first and second bridges provide the connecting component with enough rigidity and durability during ordinary driving, yet break in sequence and in stages, beginning from the weakest location, without causing the predetermined breaking locations to break all at once when major loads are applied during collisions. The predetermined breaking locations can thus easily break when major loads are applied. That is, the present invention is capable of realizing the mutually contradictory properties of sufficient rigidity and durability for normal driving and reliable breakability when substantial load is applied during vehicular collisions.

The effects of the invention are particularly effective when applied to a resin torque rod with a resin connecting component (third mode). Preferably a resin material is selected from fiber-reinforced resins, such as nylon 66 (PA66) containing glass fibers by 50 weight %, for example.

In the present invention, the first and second bushings can be disposed facing each other at right angles, and the first and second bridges can be provided at one and the other ends, respectively, in the axial direction of the second bushing (fourth mode). In this cue, the first bushing can be the larger bushing, and the second bushing can be the smaller bushing (fifth mode). With the predetermined breaking position (X) situated adjacent to the smaller bushing, upon input of the substantial load the predetermined breaking position (X) is more likely to be broken, in comparison with the case where the portion (X) is situated adjacent to the larger bushing (sixth mode).

In these cases, a rib that extends from the first bushing toward the first thin-walled bridge can be provided (seventh mode). This will allow major loads applied at the point of impact to be preferentially transmitted from the first bushing, which is where the load is input to the first bridge (rather than to the second bridge), facilitating the pressure break of the first thin-walled bridge.

According to eight mode, the connecting component comprises a pair of side panels that end in the direction linking the first and second bushing, and a connecting portion connecting them. The pair of side panels and connecting portion have a U- or H-shaped lateral cross section, and the rib is located in the space on the inside of the pair of side panels. This allows force to be more readily transmitted to the first thin-walled bridge. Constructing the connecting component in this manner allows provides the connecting component with better torsion rigidity and higher rigidity.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1A:
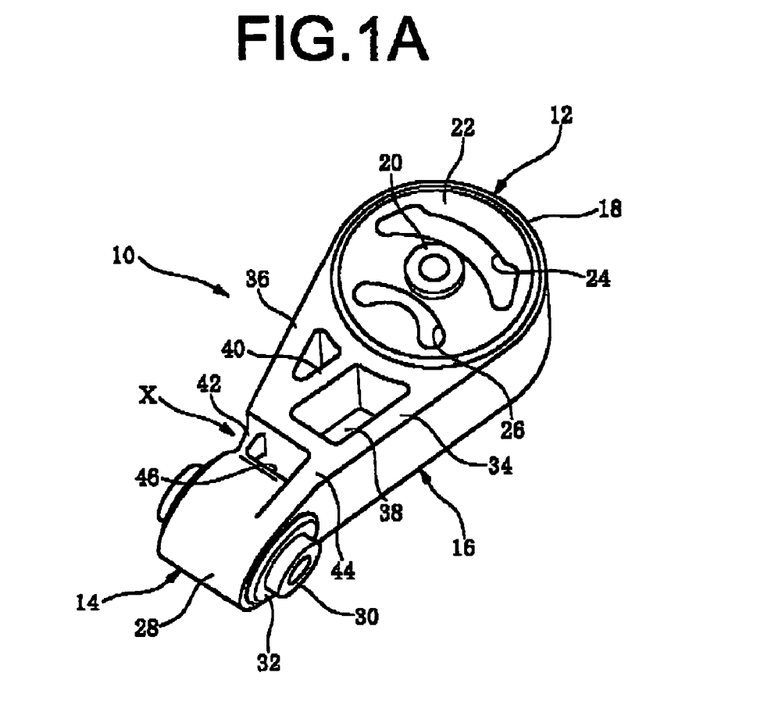
FIGS. 1A and 1B are perspective views of a torque rod of construction according to a first embodiment of the invention.
Figure 1B:
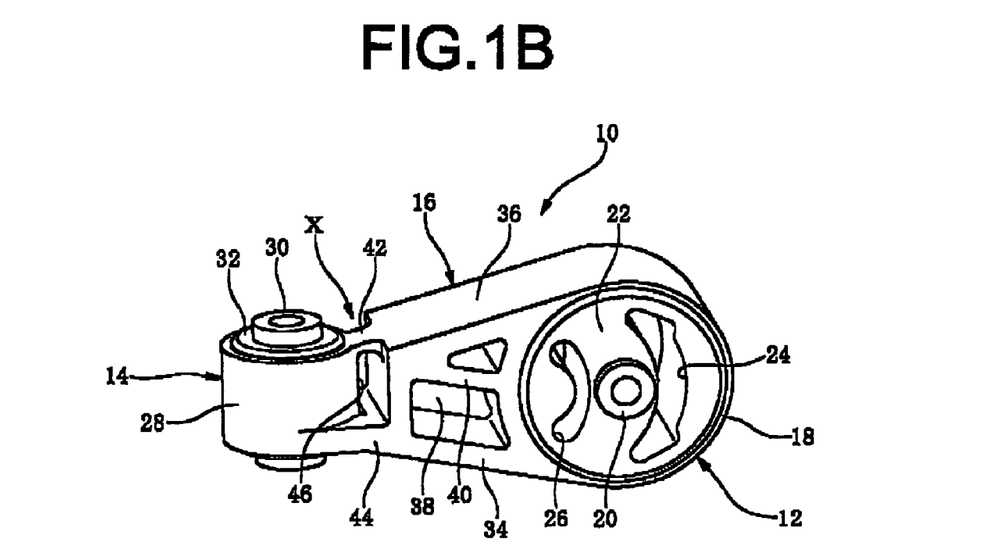
Figure 2A:
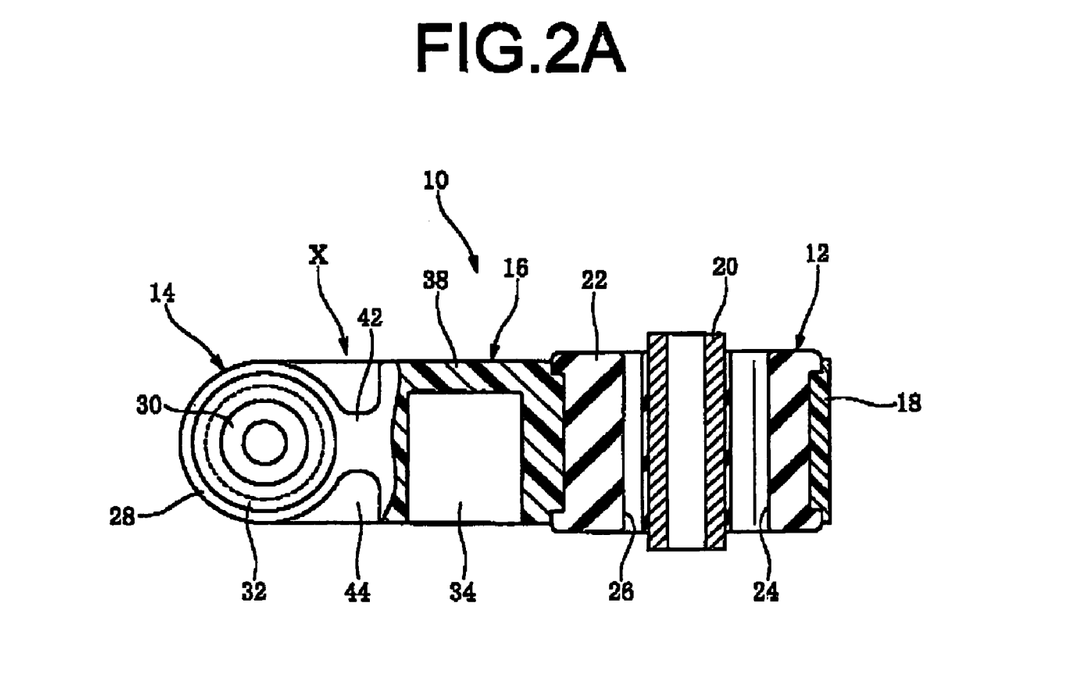
FIG. 2A Is a front view, partly in vertical section, of the torque rod of FIGS. 1A and 1B
Figure 2B:
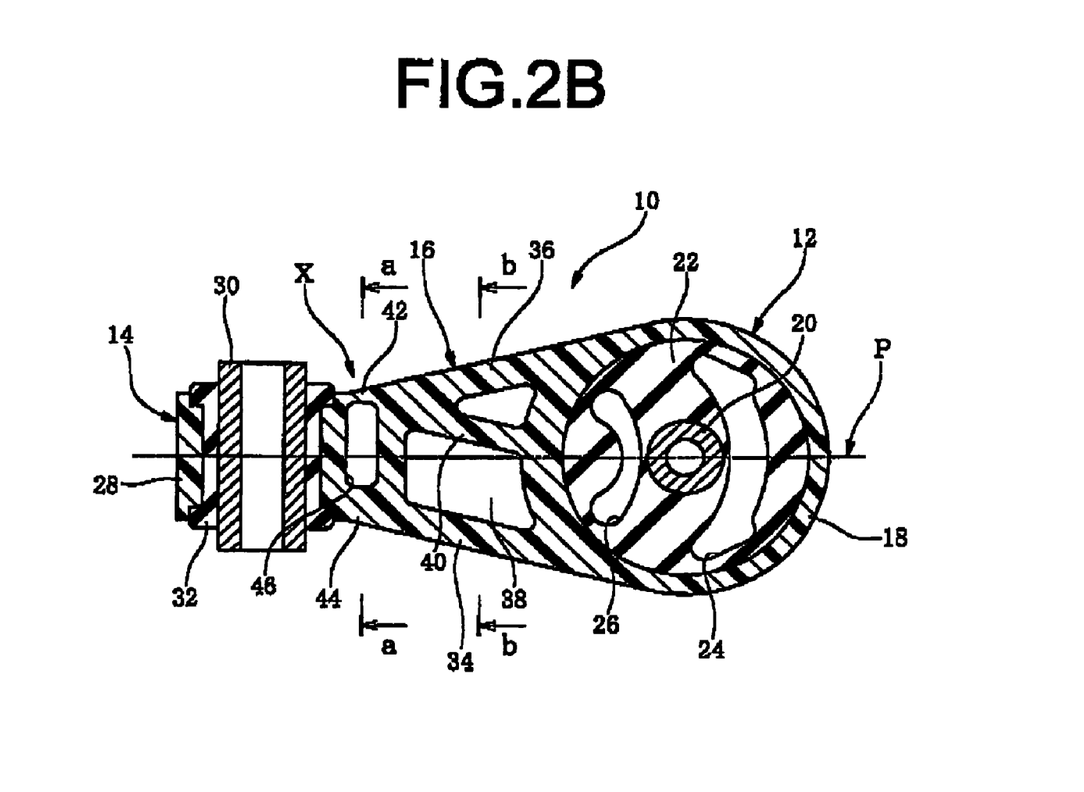
FIG. 2B is a horizontal cross sectional view of the resin torque rod of FIGS. 1A and 1B.

Referring first to FIGS. 1 and 2, 10 is the torque rod, comprising a first bushing 12 composed of a cylindrical large bushing (greater in diameter than the second bushing 14 described below) at one end, and a second bushing 14 composed of a cylindrical smaller bushing at the other end. These are joined to each other by a resin connecting component 16. The first bushing 12 and second bushing 14 are disposed facing at right angles to each other. Specifically, their axes are disposed facing at right angles.

The second bushing 14 and first bushing 12 of the torque rod 10 are elastically joined (fixed) to the engine and body sides, respectively, for example, to receive torque from the engine in order to control displacement in the engine rolling direction and displacement in the longitudinal direction of the engine. The torque rod 10 also damps vibration between the engine and body sides.

The first bushing 12 comprises a resin outer casing 18 integrally formed with the resin connecting component 16, a metal inner casing 20, and a rubber elastic body 22 interposed between the casings to join them to each other on the inside and outside. The rubber elastic body 22 is integrally bonded by vulcanization to the inner casing 20. It is also fixed to the outer casing 18 at the same time that the resin outer casing 18 is formed. The rubber elastic body 22 is also provided with voids 24 and 26 passing through in the axial direction at respective positions diametrically opposed to each other with the inner casing 20 interposed therebetween.

The second bushing 14 comprises a resin outer casing 28 integrally formed with the resin connecting component 16, a metal inner casing 30, and a rubber elastic body 32 interposed between the casings to join them to each other on the inside and outside. In the second bushing 14 as well, the rubber elastic body 32 is integrally bonded by vulcanization to the inner casing 30, and is also fixed to the outer casing 28 at the same time that the resin outer casing 28 is formed.

The rubber classic body 32 has a solid form completely filling the space between the outer casing 28 and inner casing 30 along the full axial length of the outer casing 28. Specifically, unlike the rubber elastic body 22 of the first bushing 12, it has a solid form without any recesses extending in the inward axial direction from the end surfaces of the outer casing 28, in the intermediate region in the axial perpendicular direction between the outer casing 28 and inner casing 30.

As illustrated in FIG. 2B, the entire axial length of the rubber elastic body 32 in the second bushing 14 is longer (axial length of the second bushing 14) than the resin outer casing 28. Both axial end faces of the rubber elastic body 32 protrude outwardly beyond the end surfaces in the axial direction of the outer casing 28.

As furthermore illustrated in FIG. 2A, the entire axial length of the rubber elastic body 22 In the first bushing 12 is longer (axial length of the first bushing 12) than the resin outer casing 18. Both axial end faces of the rubber elastic body 22 protrude outwardly beyond the outer casing 18.

The resin connecting component 16 comprises a pair of mutually facing side panels 34 and 36 that extend in the direction linking the first bushing 12 and second bushing 14, and a connecting portion 31 in the form of a connecting panel connecting them to each other. These parts have a U-shaped lateral cross section (see FIG. 3(B)) open in the same direction as the axial direction of the first bushing 12.

In this embodiment, the end on the second bushing 14 side of the connecting component 16 is established as a predetermined breaking location X for when substantial load is applied during collisions. In this embodiment, the predetermined breaking location X of the connecting component 16 has the following structure.

In FIG. 2B, 42 is the fit bridge, provided at a location apart to one side in the perpendicular direction from the central as P of the connecting component 16 joining the center of the first bushing 12 and the center of the second bushing 14. The first bridge 42 is formed with thin walls in the direction perpendicular to the central axis P.

44 is the second bridge, which is located in the direction perpendicular to the central axis P and apart from the central axis P in the other direction on the opposite side from the first bridge 42. The wall of the second bridge 44 is formed relatively thicker than the first bridge 42 in the direction perpendicular to the central axis P.

Figure 3A:
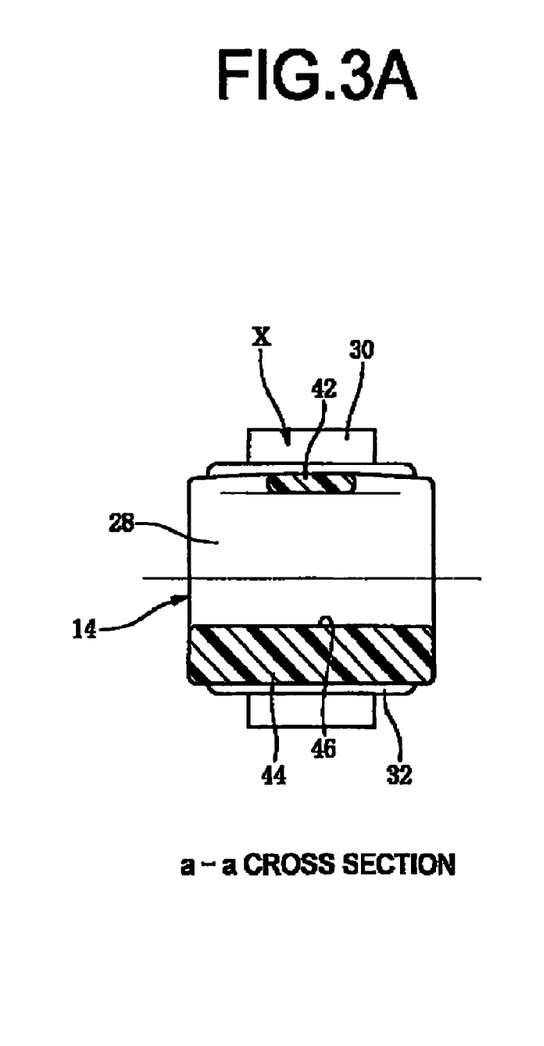
FIG. 3A is a cross sectional view taken along line a-a of FIG. 2B.
Figure 3B:
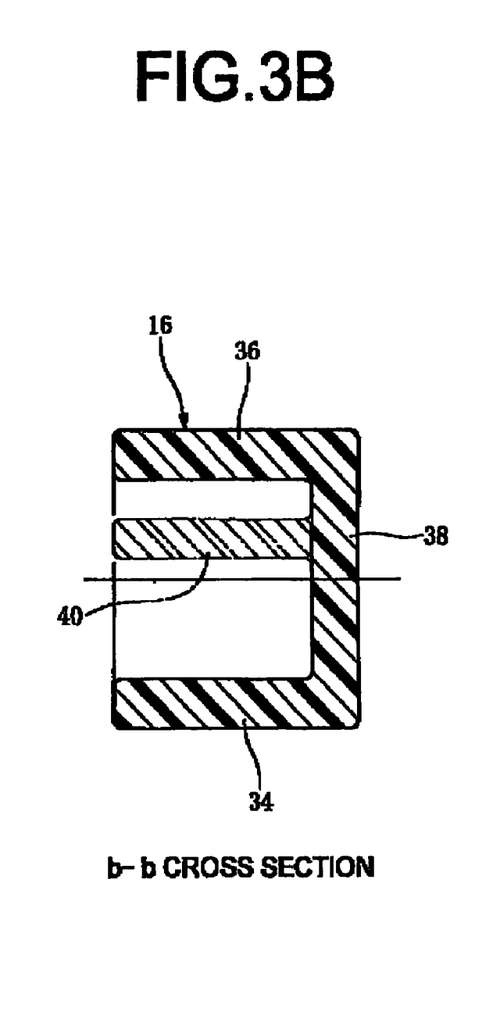
FIG. 3B is a cross sectional view taken along line b-b of FIG. 2B.

The first bridge 42 and second bridge 44 are located on one and the other sides, respectively, in the axial direction of the second bushing 14, with a space 46 passing through between them (through the left-right direction in FIG. 3A). The predetermined breaking location X in the connecting component 16 is composed of the first thin-walled bridge 42, the relatively thicker walled second bridge 44, and the space 46 between them.

The connecting component 16 is also provided with a rib 40 in the form of a panel that extends at an incline from the first bushing 12 toward the first bridge 42 in the space on the inside of the pair of side panels 34 and 36. The rib 40 extends from a point near the central axis P at an upward incline in FIG. 2(B) toward the first bridge 42.

In this embodiment, the first bridge 42 and second bridge 44 can provide the connecting component 16 with the rigidity and durability needed for normal driving. Yet the connecting component 16 can still easily break at the predetermined breaking location when major impact load is applied during vehicular collisions.

Figure 4A:
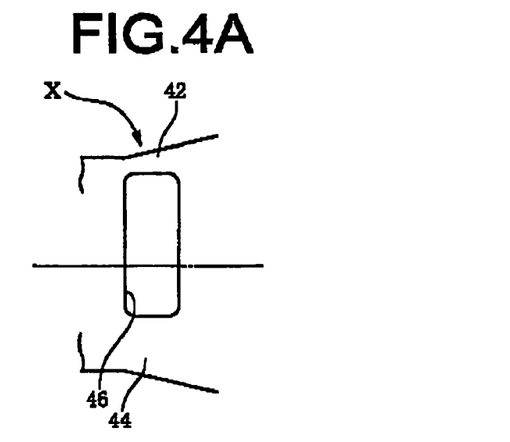
FIGS. 4A-4C are schematic illustrations showing states of a predetermined breaking location of the torque rod when broken.
Figure 4B:
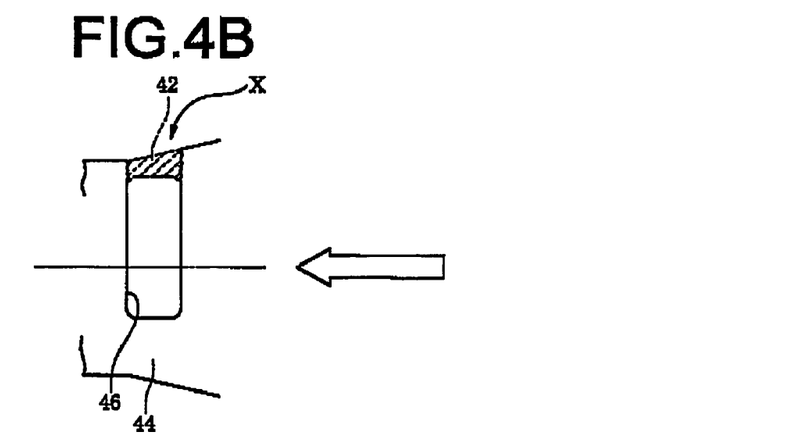
Figure 4C:
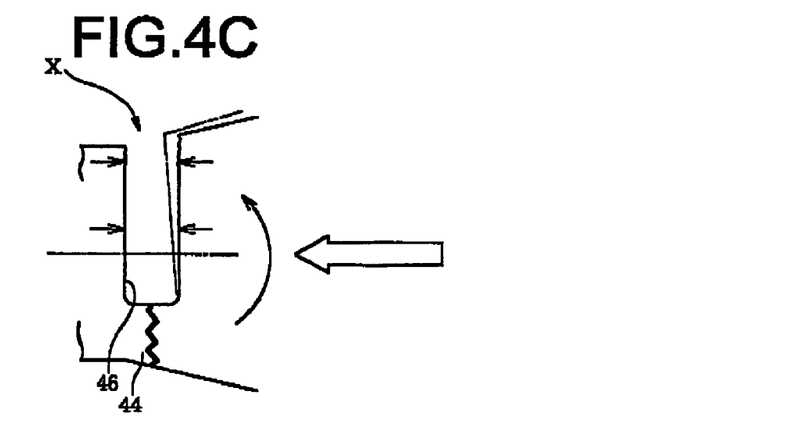
Figure 5:
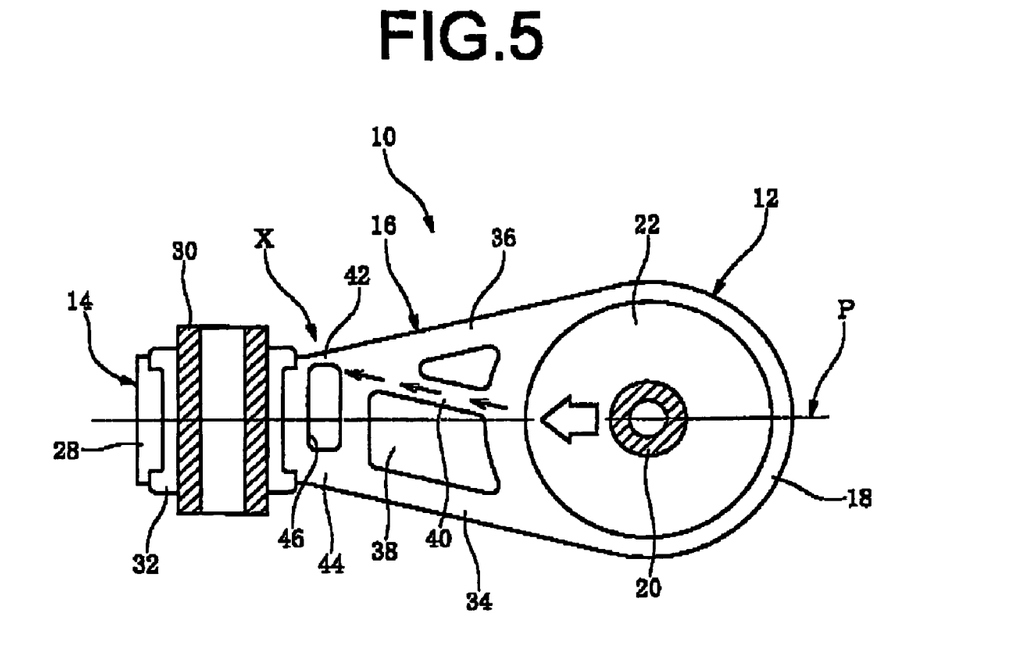
FIG. 5 is a view showing a state of operation of the torque rod of FIGS. 1A and 1B.

FIGS. 4 and 5 schematically represent this. FIG. 4A illustrates the state before breaking, where the first bridge 42 and second bridge 44 are held in their initial forms. When major impact load is applied during vehicular collision in this state, the first bridge 42 cannot withstand the major load, and the first bridge 42 is the first to buckle and break. At that point in time, the rib 40 extending at an incline toward the first bridge 42 facilitates the pressure break of the first bridge 42. FIG. 5 illustrates this in detail.

The major load exerted in the direction of the arrow in FIG. 5 through inner casing 20 of the first blushing 12 is transmitted from the first bridge 12 to the connecting component 16, along with compression break of the rubber elastic body 22 in the first bushing 12, specifically, elastic deformation in the direction of compression along the central axis P of the rubber elastic body 22.

The load transmitted to the connecting component 16 is transmitted preferentially from the center of the first bushing 12, that is, a location near the central axis P of the connecting component 16 through the rib 40 to the first bridge 42 (rather than the second bridge 44). FIG. 4B illustrates the first bridge 42 as it first buckles and breaks.

When the first bridge 42 buckles and breaks in this manner, substantial bending moment acts on the second bridge 44 as a result of the major load applied in the direction of the central axis P relative to the connecting component 16, as illustrated in FIG. 4C. As a result of the bending moment, the second bridge 44 then readily breaks, and the entire connecting component 16 breaks in the direction perpendicular to the central axis P at the predetermined breaking location X.

In the torque rod 10 in this embodiment, the first bridge 42 and second bridge 44 can provide the connecting component 16 with sufficient rigidity and durability during normal driving, yet the predetermined breaking position X can break sequentially and in stages to allow the entire connecting component 16 to readily break when major impact load is applied during collisions. Specifically, this embodiment is capable of realizing the mutually contradictory properties of sufficient rigidity and durability for normal driving and ease of breaking (reliable breakability) when substantial load is applied during vehicular collisions.

In this embodiment, the rib 40 transmits load from the first bushing 12, which is where the load is applied during collisions, to the it bridge 42, making it easier for the predetermined breaking location X to break upon major loads during collisions.

The above detailed embodiment is nothing more than an example. For example, the predetermined breaking location X in the above embodiment was established on the second bushing 14 side of the connecting component 16, but the predetermined breaking location X may be any location between the first bushing 12 and second bushing 14, and can be established at a suitable location.

The above embodiment was of an example in which the invention was applied to a perpendicular type of torque rod in which the first bushing 12 and second bushing 14 are at right angles, but the invention can also be applied to parallel types of torque rods in which the first bushing 12 and second bushing 14 face in the parallel direction.

Figure 6:
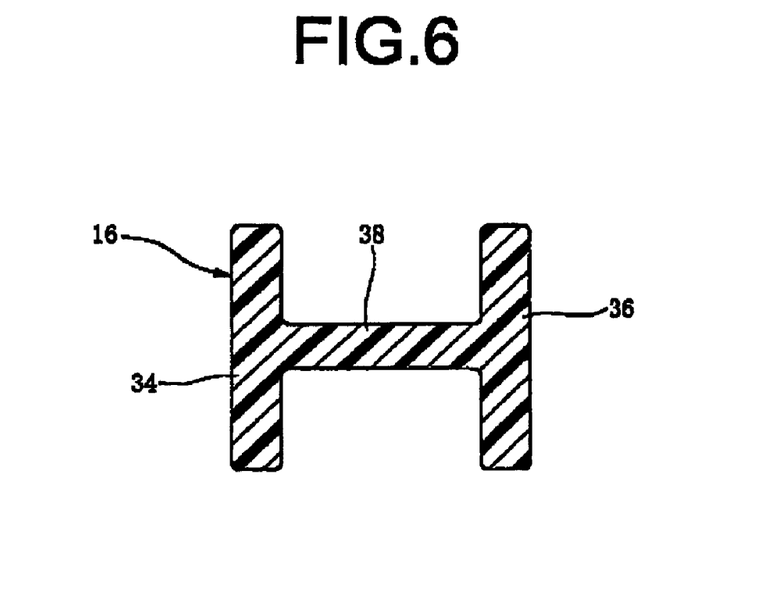
FIG. 6 is a cross sectional view showing a connecting portion used in a torque rod of construction according to another embodiment of the invention.

In the above embodiment, the pair of side panels 34 and 36 and the connecting portion 38 which form the connecting component 16 had a U-shaped cross section, but they can have a variety of shapes, such as H-shaped lateral cross section, as illustrated in FIG. 6. The inventions can assume this and a variety of other modifications without departing from the spirit of the invention.

In the above embodiment, the first bridge 42 and second bridge 44 are located on one and the other sides, respectively, in the axial direction of the second bushing 14, but the first bridge 42 may be formed at any portion where the first bridge undergoes compression break upon input of substantial load during collision of the vehicle. Also the second bridge 44 may be formed at plurality of locations at either side of the central axis P in the axis perpendicular direction.

It is also to be understood that the present invention may be embodied with various other changes, modifications and improvements, which may occur to those skilled in the art, without departing from the spirit and scope of the invention defined in the following claims.

What is claimed is:

1. A torque rod comprising:
   a first and second bushing disposed at both ends of the torque rod, each bushing having a resin outer casing and a rigid inner casing and a rubber elastic body interposed between the outer and inner casings, and
   a connecting component for connecting the first and second bushings,
   wherein the connecting component has a predetermined breaking location adapted to be broken upon input of a substantial load during collisions, the predetermined breaking location includes a thin-walled portion provided at a location where the thin-walled portion undergoes compression break upon input of the substantial load, and a thick-walled portion provided at a location apart from a central axis of the connecting component in a perpendicular direction to the central axis of the connecting component so as to undergo a bending moment break upon input of the substantial load,
   wherein an overall thickness of the connecting component varies in a direction of the central axis of the connecting component that joins a center of the first bushing and a center of the second bushing so as to provide a wide portion at one end of the connecting component and a narrow portion at another end of the connecting component and to provide the predetermined breaking location at a location on the narrow portion in the axial direction of the connecting component.

2. A torque rod according to claim 1, wherein, in the connecting component, the thin-walled portion comprises a first bridge that is provided at a location apart to one side in the perpendicular direction from the central axis of the connecting component and being thin-walled in the perpendicular direction, and the thick-walled portion comprises a second bridge that is provided at a location apart to another side in the perpendicular direction and that has a relatively thicker wall in the perpendicular direction than the first bridge; and a hollow space between the first and second bridges.

3. A torque rod according to claim 1, wherein the connecting component is made of resin.

4. A torque rod according to claim 2, wherein the first and second bushings are disposed facing each other at right angles, and the first and second bridges are located at both ends, respectively, in an axial direction of the second bushing.

5. A torque rod according to claim 4, wherein the first bushing has a greater diameter than the second bushing.

6. A torque rod according to claim 5, wherein the predetermined breaking location is formed at a portion adjacent to the second bushing.

7. A torque rod comprising:
a first and second bushing disposed at both ends of the torque rod, each bushing having a resin outer casing and a rigid inner casing and a rubber elastic body interposed between the outer and inner casings, and
a connecting component for connecting the first and second bushings, wherein
the connecting component has a predetermined breaking location adapted to be broken upon input of a substantial load during collisions, the predetermined breaking location includes a thin-walled portion provided at a location where the thin-walled portion undergoes compression break upon input of the substantial load, and a thick-walled portion provided at a location apart from a central axis of the connecting component in a perpendicular direction to the central axis of the connecting component,
in the connecting component, the thin-walled portion comprises a first bridge that is provided at a location apart to one side in the perpendicular direction from the central axis of the connecting component and being thin-walled in the perpendicular direction, and the thick-walled portion comprises a second bridge that is provided at a location apart to another side in the perpendicular direction and that has a relatively thicker wall in the perpendicular direction than the first bridge; and a hollow space between the first and second bridges,
the first and second bushings are disposed facing each other at right angles, and the first and second bridges are located at both ends, respectively, in an axial direction of the second bushing, and
the connecting component is provided with a rib that extends in a direction from the first bushing toward the first bridge so that the input substantial load is mainly transmitted from the first bushing, which is where the load is input, to the first bridge rather than to the second bridge.

8. A torque rod according to claim 7, wherein the connecting component comprises a pair of mutually facing side panels that extend in a direction linking the first and second bushings, and a connecting portion connecting the side panels, the pair of side panels and connecting portion having a U- or H-shaped lateral cross section open in a same direction as an axial direction of the first bushing, and the rib being located in a space on an inside of the pair of side panels.

* * * * *